US008275644B2

(12) United States Patent
Cases et al.

(10) Patent No.: US 8,275,644 B2
(45) Date of Patent: Sep. 25, 2012

(54) GENERATING AN OPTIMIZED ANALYTICAL BUSINESS TRANSFORMATION

(75) Inventors: Moises Cases, Austin, TX (US); Bhyrav M. Mutnury, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1197 days.

(21) Appl. No.: 12/103,757

(22) Filed: Apr. 16, 2008

(65) Prior Publication Data

US 2009/0263768 A1 Oct. 22, 2009

(51) Int. Cl.
*G06F 17/30* (2006.01)
(52) U.S. Cl. ...................................... 705/7.11
(58) Field of Classification Search .................. 705/7.11
See application file for complete search history.

(56) References Cited

U.S. PATENT DOCUMENTS

| | | |
|---|---|---|
| 6,411,936 B1 | 6/2002 | Sanders |
| 7,257,561 B1 | 8/2007 | Abe |
| 2002/0128895 A1 | 9/2002 | Broderick et al. |
| 2004/0078309 A1 | 4/2004 | Norquist et al. |
| 2005/0065941 A1* | 3/2005 | DeAngelis et al. ........... 707/100 |
| 2005/0267807 A1 | 12/2005 | Bentley, III |

OTHER PUBLICATIONS

Donald Kossmann; "The State of the Art in Distributed Query Processing"; ACM Computing Surveys; vol. 32, No. 4; Dec. 2000; pp. 422-469.
Bohte, SM et al.; "Market-Based Recommendation: Agents That Compete for Consumer Attention"; ACM Transactions on Internet Technology; vol. 4, No. 4; Nov. 2004.
Barumandl et al.; "Qouality of Service in an Information Economy"; ACM Transactions on Internet Technology; vol. 3, No. 4; Nov. 2003; pp. 291-333.
Keith D. Swenson; "Workflow Technology: Tradeoffs for Business Process Re-engineering"; Fujitsu Open Systems Solutions, Inc.; pp. 22-29; 1995 ACM; San Jose, CA.

* cited by examiner

*Primary Examiner* — Romain Jeanty
(74) *Attorney, Agent, or Firm* — Yudell Isidore Ng Russell PLLC

(57) ABSTRACT

Techniques for optimizing a Business Process Model (BPM) having at least one work process are presented. At a simulation client, a determination is made whether a simulated business outcome associated with a test BPM satisfies a business value deficiency associated with a current BPM. In response to a determination that the simulated business outcome does not satisfy the business value deficiency, the test BPM is optimized. Once the simulation client determines that the simulated business outcome satisfies the business value deficiency, the test BPM is implemented as an actual BPM. Moreover, an actual business outcome associated with the actual BPM is generated. A determination is made whether the actual business outcome satisfies the simulated business outcome. In response to a determination that the actual business outcome does not satisfy the simulated business outcome, the actual BPM is optimized.

12 Claims, 4 Drawing Sheets

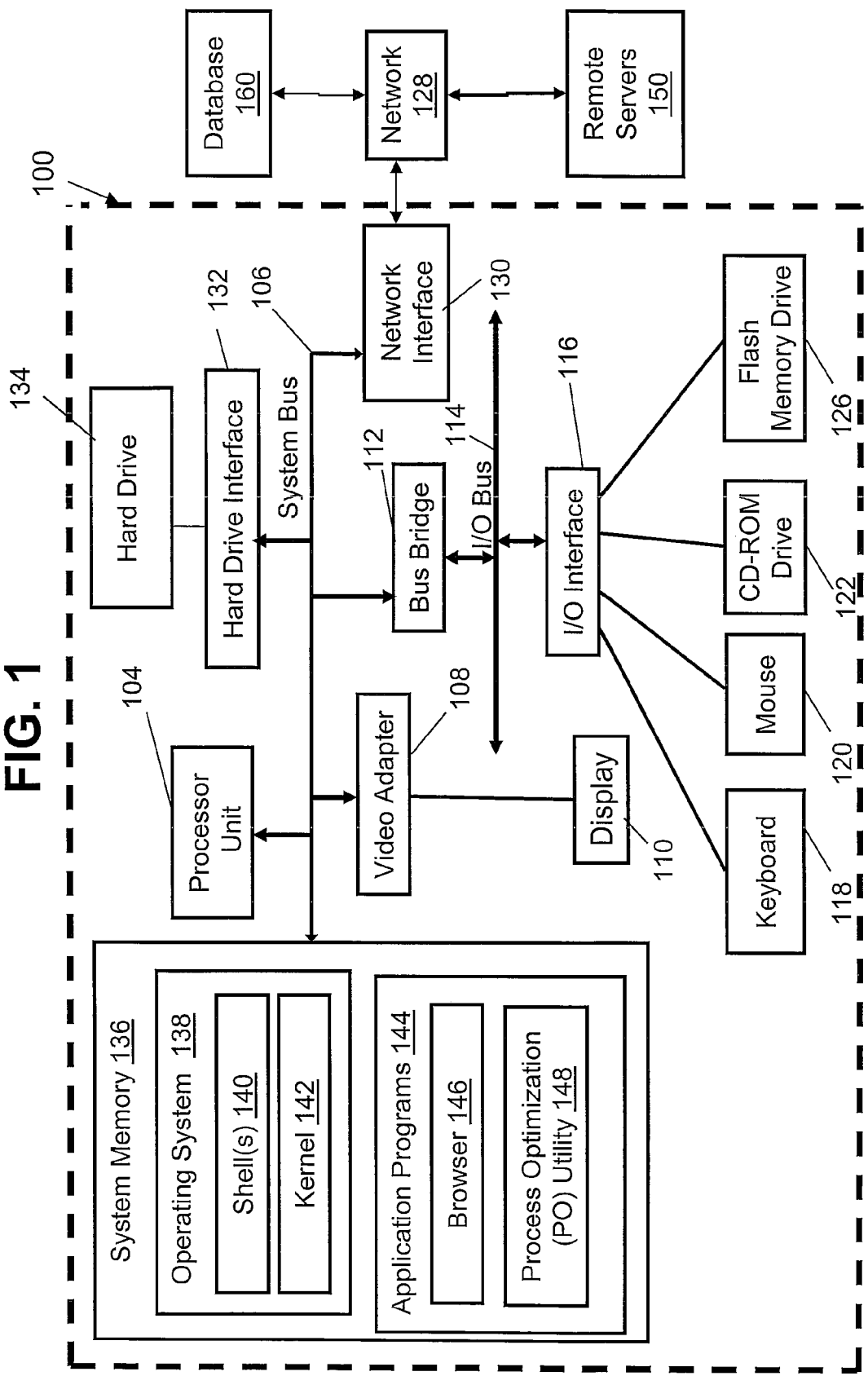

GENERATING AN OPTIMIZED ANALYTICAL BUSINESS TRANSFORMATION

BACKGROUND OF THE INVENTION

1. Technical Field

The present invention relates in general to business process transformations, and in particular, to a method and system for optimizing business and work processes utilizing intelligent feedback mechanisms.

2. Description of the Related Art

Improving existing business and work processes is a critical element of business management for an organization. A business process or business method is a collection of interrelated tasks, which solve a particular issue. There are three main categories of business processes: management processes, operational processes, and supporting processes. Management processes govern the operation of a system. Examples of management processes include corporate governance and strategic management. The second main category of business processes, operational processes, constitutes the core business and creates the primary value stream. Typical operational processes are purchasing, manufacturing, marketing, and sales. Supporting processes, the last main category, are those processes that support the core processes. Examples of supporting processes include accounting, recruitment, and Information Technology (IT)-support.

A business process can be decomposed into several sub-processes, known as work processes, which have their own attributes and tasks, but also contribute to achieving the goal of the super-process (i.e., the business process). Thus, the analysis of business processes typically includes the mapping of processes and sub-processes down to task level. As business processes and their associated work processes become more complex, it becomes necessary for business planners to create and run computer-based models such that a more accurate business outcome can be derived based on a particular business value proposition. While it would be highly desirable for these models to take into account all possible input variations (i.e., business value propositions), the reality is that existing models are limited in practice to the number of variables and the combination of those inputted variables. Practically speaking, running such complex business models could take weeks, if not months to yield an optimized business solution.

Under existing methods, the interaction between business value propositions is typically explored and simulated using a brute-force full factorial method or a Monte Carlo exploration of the input combinations (which may run in the hundreds of thousands of combinations). A Monte Carlo method is a computational algorithm that relies on repeated random sampling to compute its results. Because of their reliance on repeated computation and random or pseudo-random numbers, Monte Carlo methods are most suited to calculation by a computer. Monte Carlo methods tend to be used when it is infeasible or impossible to compute an exact result with a deterministic algorithm. The pattern is typically as follows: a domain of possible inputs is defined, the possible inputs are generated randomly from the domain, a deterministic computation is performed on the generated inputs, and the results of the individual computations are aggregated into the final result.

However, there are several disadvantages associated with these existing methods. First, neither the brute force method nor the Monte Carlo method is capable of performing self-correction of the input variables without human intervention. Second, current methods fail to account for every new business values proposition that is modeled and modified to check for the modeled outcome. In this regard, current business transformations seeking to meet new market and technology opportunities rely primarily on human intuition, which is based largely upon the businessperson's perceived experiences, as well as the evaluation of business study cases. As a result, the above processes are primarily qualitative in nature.

The present invention therefore recognizes that it would be useful and desirable to establish a formalized method and system for generating an optimized analytical business transformation.

SUMMARY OF THE INVENTION

In view of the foregoing, techniques for optimizing a Business Process Model (BPM) having at least one work process are disclosed. At a simulation client, a determination is made whether a simulated business outcome associated with a test BPM satisfies a business value deficiency associated with a current BPM. In response to a determination that the simulated business outcome does not satisfy the business value deficiency, the test BPM is optimized. Once the simulation client determines that the simulated business outcome satisfies the business value deficiency, the test BPM is implemented as an actual BPM. As a result, an actual business outcome associated with the actual BPM is generated. A determination is made whether the actual business outcome satisfies the simulated business outcome. In response to a determination that the actual business outcome does not satisfy the simulated business outcome, the actual BPM is optimized.

The above, as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 1 is a pictorial representation of a data processing system;

DETAILED DESCRIPTION OF A PREFERRED EMBODIMENT

Figure 2A:
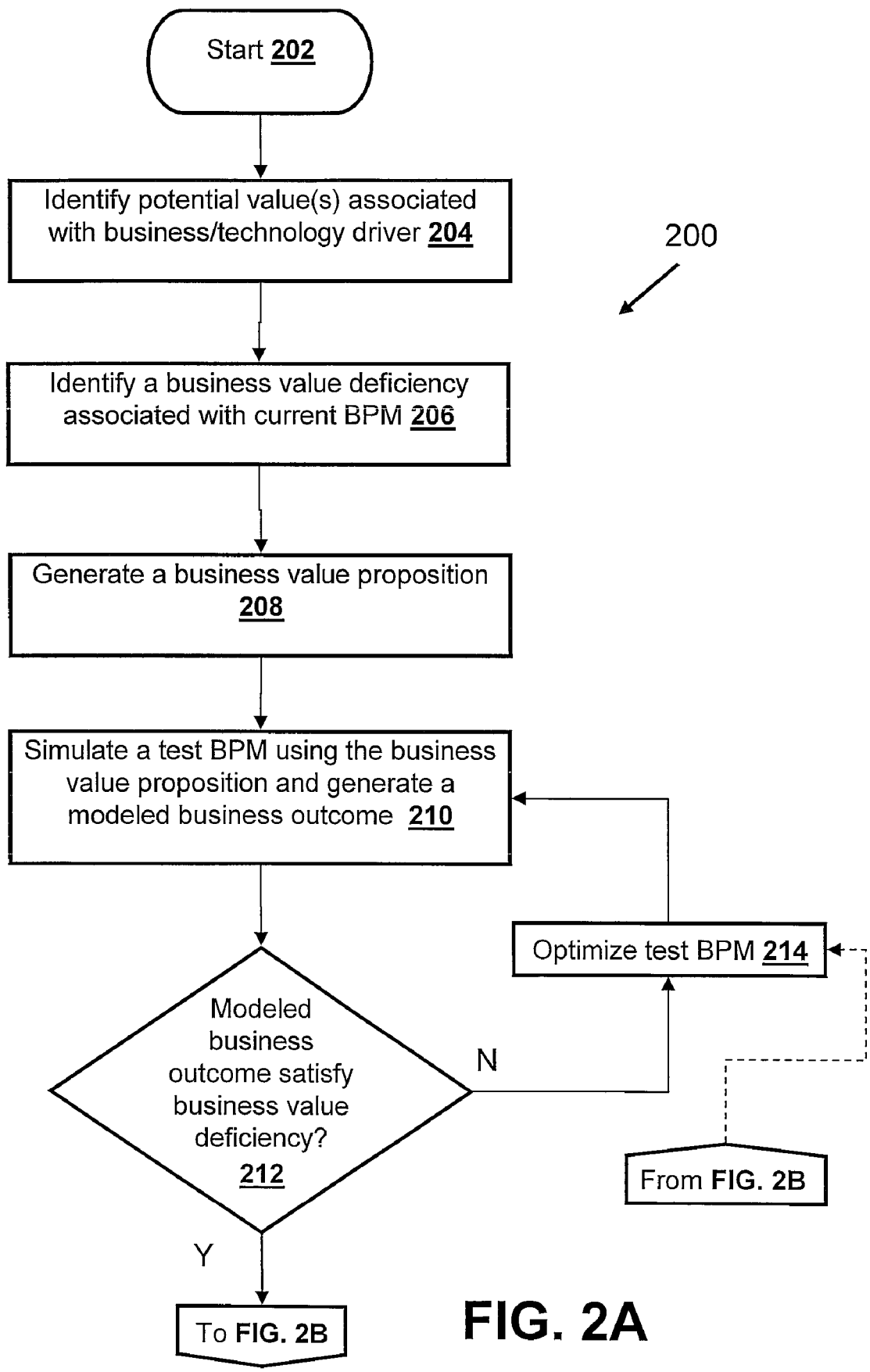
FIGS. 2A and 2B together form a high level logical flow-chart of an exemplary method of optimizing business and work processes, according to an embodiment of the invention.

The present invention provides for a more efficient optimizing of business and work processes as a function of behavioral model analysis and actual business implementation data. In accordance with at least one embodiment of the present invention, an intelligent feedback system is utilized for tracking the effect of process variations on business outcomes. Such an intelligent scheme would allow the business and work processes to automatically converge to improved combination(s) of business and work process variations on business outcomes. Moreover, the intelligent feedback system takes into account existing and/or new input variables, without the need for human intuition in selecting which input variables to use in simulating a business/work process model for the optimization of business outcome(s).

The intelligent feedback system includes a series of feedback mechanisms which are utilized at various stages of Business Process Model (BPM) formulation, simulation, and testing. The first feedback mechanism seeks to optimize a test BPM based on the degree in which the test BPM satisfies (or does not satisfy) an identified business value deficiency. The test BPM is initially developed, for example, by inputting data derived from actual case studies which have been correlated with actual past business outcomes. Once the test BPM has been developed, the test BPM is tested under a simulated computer environment, which accounts for previous business model cause and effect relationships. If the modeled business outcome of the test BPM does not reflect the expected business values, the existing set of input variables and their associated simulated business outcome are stored in an optimization library. The optimization library can be later accessed (and factored) in future BPM optimizations. Moreover, the existing set of input variables are then changed and re-simulated until the optimized test BPM satisfies the identified business value deficiency.

The second feedback mechanism occurs within the context of an actual implementation of the test BPM (now referred to as an actual BPM). At this point, the actual BPM may have undergone previous optimizations under the first feedback mechanism. Such testing occurs under actual, present conditions to generate actual business outcomes. The second feedback mechanism seeks to measure how accurate the actual business outcome of the actual BPM matches up to the modeled business outcomes of the test BPM. The input variables that compose the actual BPM are changed and re-tested under actual conditions until the actual business outcome satisfies the modeled business outcome. Any changes in the input variables which produce an improved actual BPM are then used to update the optimization library for future test BPMs With reference now to the figures, and in particular to FIG. 1, there is depicted a block diagram of an exemplary computer/data processing system 100, with which the present invention may be utilized. Computer 100 includes a processor unit 104 that is coupled to a system bus 106. A video adapter 108, which drives/supports a display 110, is also coupled to system bus 106. Display 110 is used for receiving and viewing the results of the analyses. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a remote server 150 and database 160 via a network 128 using a network interface 130, which is coupled to system bus 106. Network 128 may be an external network such as the Internet, or an internal network such as an Ethernet or a Virtual Private Network (VPN). Remote server 150 may be architecturally configured in the manner depicted for computer 100. Although illustrated as being connected to network 128, another embodiment of the present invention may be configured without a network. For example, the present invention may include or operate within a standalone computer or a computer having direct connections to a database and other computing elements. Further, the present invention does not necessarily require a database. However, in embodiments that include a database, the one or more databases may be any suitable technique for storing data and/or other information that allows retrieval through the use of a computer, such as, for example, an Oracle® database (Oracle is a registered trademark of Oracle Corp.), a DB2® database (DB2 is a registered trademark of IBM Corporation), a MySQL® (MySQL is a registered trademark of MySQL AB A Company) database, or one or more data files.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX® (UNIX is a registered trademark of The Open Group in the United States and other countries)) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with remote server 150. Application programs 144 in system memory 136 also include a Process Optimization (PO) utility 148, which executes on computer 100. PO utility 148 performs the functions illustrated below in FIG. 2, and may include all logic, helper functions, databases and other resources depicted below in FIG. 3. PO utility 148 processes electronic signals from a multitude of sources, such as remote server 150 and database 160 in network 128, as well as from other application programs 144.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Referring now to FIG. 2, a high-level flow chart showing the method 200 of optimizing a Business Process Model (BPM) is presented. Generally, the key to a successful re-engineering of a business process is to thoroughly understand the details of the existing business/work process and to accurately forecast the results of the changes to that process. In order to analyze and predict the outcome of a revised process, a business first has to create an accurate representation of the process with a model and then must study how that process performs under different conditions/variables. A common error that businesses often make when they set out to revise their business processes is failing to fully investigate and understand their current business process and their objectives in re-engineering that business process. As a result, a business can find that either they have not adequately addressed the original problem, or they have simply exchanged a recognized problem for another unanticipated one.

As depicted in FIG. 2, method 200 begins at block 202 and continues to block 204, in which potential value(s) associated with one or more business/technology drivers are identified. Business/technology drivers are external or internal influences that impact and/or set direction for a business. Different businesses can have different business/technology drivers. Examples of business drivers include, but are not limited to, revenue generation, cost savings, waste reduction, business agility, optimizing workforce allocations, time to market, and customer retention. Technology drivers specifically refer to leading-edge process/product technology that drives development of next-generation equipment, unit processes, and manufacturing techniques.

From block 204, the method continues to block 206, in which a business value deficiency associated with a current BPM is identified. Business value deficiencies refer to internal or external business/technology factors that impede the realization of potential business value(s). To address the potential business value(s) (e.g., cost savings, net profit) that can be derived from business process transformation, one or more business value propositions are generated, as depicted in block 208. The business value propositions serve as specific input variables which are applied to the current BPM to configure a test BPM. There are several modeler tools that can be utilized to create a test BPM. For example, one such modeler tool is WebSphere® Business Modeler (WebSphere is a registered trademark of IBM Corporation).

Method 200 continues from block 208 to block 210, where the test BPM is simulated at a simulation client (e.g., simulator utility within WebSphere® Business Modeler) using the current business value proposition(s) and a modeled business outcome is generated. As used herein, a simulation client refers to a special-purpose or a general-purpose computer, such as computer/data processing system 100 (FIG. 1), which is utilized as a simulation platform.

The simulation of a test BPM requires several steps. First, resources and probabilities must be defined. Resources, for example, may include, but are not limited to (i) corporate strategies, (ii) human resources needs and costs, (iii) resource duration, and (iv) human resource availability. Probabilities include decision probabilities and/or output probabilities. Since one of the components of a test BPM is a decision, a user can assign a probability on decision choices (e.g., is a customer an existing customer?). Such decision choices assist in determining the method of selecting a path through the simulated test BPM. Moreover, a user can define probabilities on output criteria, which are allowable combinations of outputs for an activity.

As a second step within simulation of a test BPM, a simulation profile and attributes related to the one or more simulation runs are defined. The assessment of the current BPM provides information about the duration of the benchmark to reflect a representative simulation. Third, a simulation environment is populated with the simulation attributes defined above. Simulation attributes allow a user to configure a test BPM so that the test BPM behaves in a manner that resembles a real world or actually implemented business process. Fourth, when a test BPM is simulated, the simulator utility adds a simulation snapshot as a child element of the test BPM in a project tree. A simulation snapshot is a record of the complete process model at the moment when the test BPM is simulated. The simulation snapshot contains a copy of all of the elements of a project that the test BPM may utilize, such as business items, resources, and global tasks. Moreover, it is possible to create multiple simulation snapshots for the same test BPM after making changes to the project or to the test BPM itself to better compare the effects of such changes.

In decision block 212, a determination is made whether the modeled business outcome satisfies (i.e., mitigates or resolves) the business value deficiency. If the modeled business outcome does not satisfy the business value deficiency, the test BPM is then modified by changing the structure of business/work processes. As a result, a new test BPM is created, as depicted in block 214. Method 200 returns to block 210, where a new test BPM is simulated and then proceeds to decision block 212. The method steps shown in blocks 210, 212, and 214 are iterated until the modeled business outcome that is derived from the simulated test BPM satisfies the business value deficiencies.

Figure 2B:
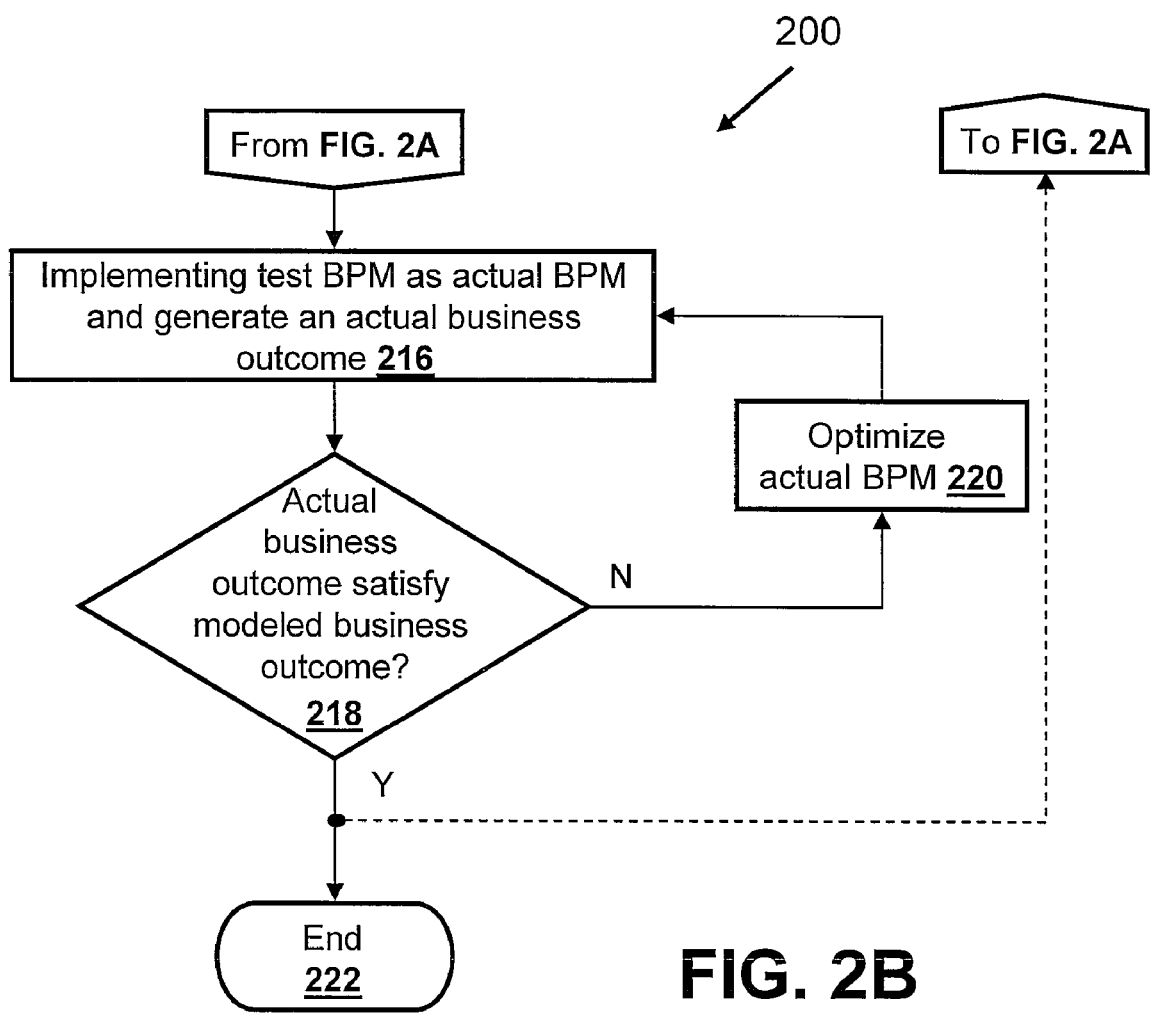

Once a determination is made that the modeled business outcome from the modified test BPM satisfies the business value deficiency/deficiencies, operation 212 continues to block 216 of FIG. 2B, where the test BPM proceeds to actual implementation as an actual BPM and an actual business outcome is generated. From block 216, method 200 continues to decision block 218, where a determination is made whether the actual business outcome satisfies the modeled business outcome. If the actual business outcome does not meet or exceed the modeled business outcome, the actual BPM is optimized as depicted in block 220 and operation returns to block 216. Such steps depicted in blocks 216, 218, and 220 are designed such that any prior modeling and BPM optimization inaccuracies can be corrected. In this regard, it should be noted that the actual BPM that is optimized in block 220 does not return for simulation, but rather undergoes further actual implementation under real world conditions. Once it is determined that that the actual business outcome of the actual BPM satisfies the modeled business outcome, the actual BPM is considered optimized and method 200 terminates at block 222. According to another embodiment, once the actual BPM is considered optimized, the particular parameters of the actual BPM (i.e., input variables and actual business outcome) are used to modify/optimize the test BPM at block 214 (represented by dashed arrow). This ensures that any future changes to the input variables are simulated in block 210 using the most optimized BPM, which accounts for the previous actual implementation.

It should be appreciated, however, that the steps depicted in blocks 216, 218, and 220 can include additional sub-steps that may or may not be executed outside of computer system 100. Such sub-steps would depend upon the nature of the business/work process. For example, a business analyst may want to optimize the quality of a customer service call center. To achieve this, quality testing of a customer service call center BPM may incorporate automated phone-dial surveys to automatically measure and collect feedback relating to customer service call center quality. In this regard, some steps in the process are performed by computer 100 (i.e., automated phone-dial survey), while other steps (i.e., the actual feedback that is dialed in) is performed by the actual customer. Other steps may be performed entirely by computer 100, such as measuring and recording the customer wait time during a particular time period.

Figure 3:
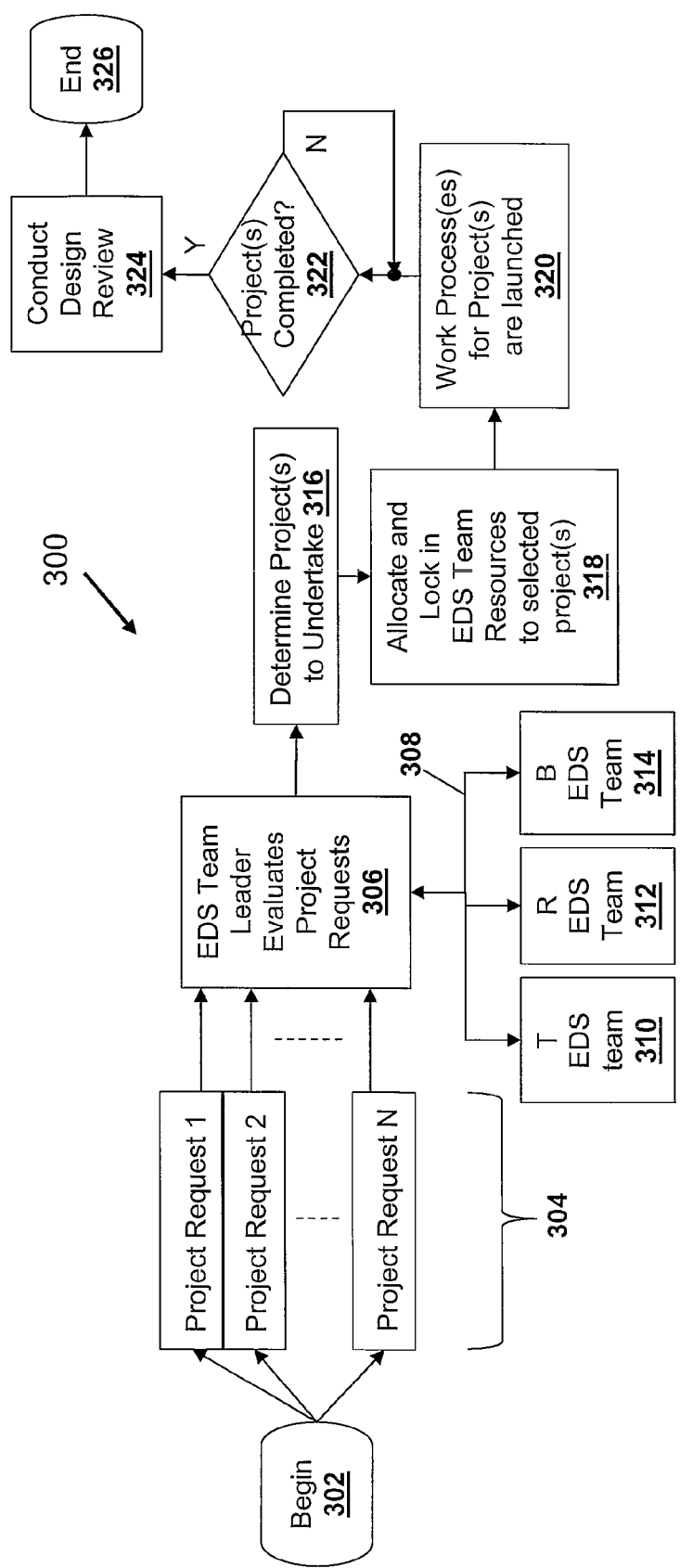
FIG. 3 depicts an exemplary business and work process flow diagram that may be optimized in accordance with the teachings of the present invention.

As can be observed, there are various intelligent feedback loops which are potentially run depending on what stage of business/work process optimization has been attained. With reference now to FIG. 3, there is illustrated a work flow diagram of an exemplary business/work process 300 that can be optimized in accordance with the present invention. Diagram 300 depicts an exemplary business model for providing electronic design services toward the production of servers, such as tower (T), rack-mounted (R), and blade (B) types. Beginning with start block 302, project requests for design services associated with varying server types (i.e., T, R, and/or B) are first submitted with the Electronic Design Services (EDS) team (block 304). From the time a project has been selected by the EDS team, a typical project's duration (i.e., from concept to delivery) is between 12 and 18 months.

Depending on the project type, the work processes and associated tasks needed to complete the project can vary considerably. For instance, such differences in work processes can be reflected in the particular skill set and resources that may be required for a certain project type. Typically, an EDS team leader will evaluate the various project requests (block 306) and determine whether the EDS team possesses adequate resources and skill sets to satisfactorily complete the project in the allotted time. However, it is critical to note that the team leaders base their decisions on the perceived resource availability and personnel skill sets needed for the particular project as opposed to utilizing actual quantitative data This requires some level of interaction (arrows 308) between the EDS team leader and the EDS team members specialized in the particular T, R, or B server type (blocks 310-314, respectively) related to the project that is being evaluated.

Once the team leader has determined which one(s) of various project requests to undertake (block 316), the resources are allocated to the selected project and locked in (block 318). Work processes are then launched either sequentially or in parallel as determined by the EDS team leader (block 320). Once the project is completed (decision block 322), a design review is conducted (block 324). Flow diagram 300 then terminates at block 326.

To optimize exemplary business/work process flow diagram 300, the exemplary method depicted in flow chart 200 (FIG. 2) can be applied. However, it is important to preface that the example described below does not limit the applicability of the present invention. Applying the method steps in block 200, the business and/or technology drivers are identified by the EDS team (block 202). In this example, the business drivers are: (i) reduced time to market and (ii) first to market. These drivers are intended to leverage market monopoly while maintaining cost reduction of the server products. The potential values associated with the business driver are to: (i) increase revenue, (ii) increase profit, and (iii) improve shareholder value.

To achieve the potential values listed above, one or more business value deficiencies are identified in view of the current BPM (block 206). In the example presented, the EDS team identifies that the server group has been lagging with regard to some of the potential values. Moreover, in regard to other identified business values, maintaining market leadership is another business value identified by the EDS team.

To address the potential values, new business value propositions are generated (block 208). For example, the following new business value propositions were generated by the EDS team: change/modify work processes for improved efficiency, change/modify business processes to improve time to market, optimizing the allocation of resources and of people having particular skill sets, reducing the cost of manufacturing by optimizing equipment and software usage, and improving the people network to raise employee morale.

Once the business value proposition has been generated, the business value proposition is modeled as a test BPM and simulated to generate a modeled business outcome (block 210). The effect of change in a given new business value proposition is studied and trained using Artificial Neural Networks (ANNs). ANNs are mathematical models or computational models based on biological neural networks. ANNs include an interconnected group of artificial neurons (called nodes) and process information using a connectionist approach to computation. A "connectionist" approach is an approach that is used in the field of Artificial Intelligence (AI) which models behavioral phenomena as the emergent processes of interconnected networks of simple units. While there are different forms of connectionism, one of the most common forms utilize ANN models. In most cases, the ANN is an adaptive system that changes its structure based on external or internal information that flows through the network during the learning/training phase. ANNs are used to model complex relationships between inputs and outputs, or to find patterns in data. In one embodiment, the ANN is trained for use with the BPM by taking new business value propositions as inputs and modeled business outcomes as outputs.

There are three main components to an ANN: a set of input nodes, one or more layers of hidden nodes, and a set of output nodes. Input nodes contain input values which are used to analyze a particular BPM. Hidden nodes receive a weighted sum of the input values. The output nodes contain the output values which form part of the generated business outcome. Each node sums the activation values it receives, arrives at its own activation value, and then passes that along to the next nodes in the network (after modifying its activation level according to its transfer function). Activation (and activation values) are common aspects of connectionist models. At any time, a unit in an ANN has an activation value, which is a numerical value intended to represent some aspect of the unit. Thus the activation flows through the net in one direction, from input nodes, through the hidden layers of nodes, until eventually the output nodes are activated. If the ANN is properly trained, this output (i.e., business outcome) should reflect the input variable(s) (i.e., business value propositions) with statistical confidence.

For each change in the business value propositions (i.e., input variables) that is tracked, the modeled business outcome (i.e., output) is recorded. The new business value propositions are changed in steps and the impact of the business value propositions on modeled business outcomes is recorded accordingly. The number of hidden layers and the neurons in the hidden layers are increased until the ANN output(s) matches the modeled output. Thus, if the modeled business outcome does not satisfy the business value deficiency (decision block 212), the test BPM undergoes optimization, in which a new combination of business value propositions are used to form the test BPM (block 214).

The interaction between different existing business value propositions and the generation of new combinations of input variables is achieved by utilizing one or more Genetic Algorithms (GAs). By ensuring that the modeled business outcome matches the identified business value deficiencies, the GA allows for the new business value proposition input variables to be varied in a manner that results in faster, more efficient optimization. The GA utilizes a fitness function, which evaluates a solution domain and defines the degree by which the modeled business outcome deviates from the business value deficiency. Based on the fitness function, the new business value propositions are crossed-over and mutated in an intelligent fashion to attain an optimal combination of new business value proposition variables. Thus, the use of GAs matches, in a considerably shorter time, the modeled business outcome to the business value deficiencies, without having to simulate all possible combinations of business value propositions to achieve the required business outcome.

The ANN, with the assistance of GAs, learns more quickly the effect of each input variable on the business outcome, which helps to prevent modeling of all new business value propositions that lie within the ANN's confidence levels, which indicate the reliability of an estimated business outcome. This is achieved by interpolating and extrapolating the modeled business outcomes that are yielded over the course of various iterations (blocks 210, 212, and 214), until the required modeled business outcome is achieved. Once the ANN output (i.e., the business outcome yielded using the ANN) matches the modeled output that is yielded from repeated simulations, the modeled output is no longer utilized for modeling purposes. Instead, the ANN output is used in place of the modeled output. The use of a trained ANN obviates the need for additional simulations using additional combinations of input variables. Moreover, the trained ANN generates the same output, but in significantly less time, than if the test BPM were simulated with the same combination of input variables.

Once the required modeled business outcome is achieved, the modified test BPM with its associated work processes are actually implemented (block 216). In this regard, it should be pointed out that actual implementation is distinct from simulation in that an actual implementation of the BPM occurs under real life conditions and not under simulated conditions. The actual business outcome is now checked to see whether the actual business outcome matches or improves upon the modeled business outcome. If the actual business outcome does not satisfy the modeled business outcome, further optimizations of the actual BPM are required (block 220). In this regard, the same ANN and GA approach described above is applied when trying to match the modeled business outcome with that of the actually implemented business outcome. During the optimization/remodeling step (block 220), the ANN takes the actual business outcome that is recorded and calculates the error between the modeled business outcome and the actually implemented business outcome. The optimization step takes this error data to remodify the actual BPM. The newly remodified actual BPM is then re-implemented under actual conditions (block 216). The steps described in blocks 216, 218, and 220 of method 200 iterate until the actual business outcome satisfies the modeled business outcome, which then marks the end of the process optimization method 200 (block 222).

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been particularly shown as described with reference to exemplary embodiment(s), it will be understood by those skilled in the art that various changes in form and detail may be made therein without departing from the spirit and scope of the invention. For example, one of the embodiments of the invention can be implemented as sets of instructions resident in data storage (e.g., system memory 136) of one or more computer systems configured generally as described in FIG. 1. Until required by computer system 100, the set of instructions may be stored in another computer readable storage device or computer readable storage medium, such as: (i) hard drive 134, (ii) in a removable storage device such as an optical disk for eventual use in CD-ROM drive 122, or (iii) flash memory drive 126 that supports storage and retrieval of data over a USB, or other suitable interface. The computer readable storage device that stores the set of instructions may be referred to as a computer program product. Further, the set of instructions can be stored in the memory of another computer and transmitted over a local area network or a wide area network, such as the Internet, when desired by the user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A data processing system, comprising:
a processor; and
data storage coupled to said processor; and
process optimization utility code within said data storage and executable by said processor to optimize a Business Process Model (BPM) having at least one work process by determining whether a simulated business outcome associated with a test BPM satisfies a business value deficiency associated with a current BPM, and wherein responsive to a determination that said simulated business outcome does not satisfy said business value deficiency, said process optimization utility code optimizes said test BPM, and wherein responsive to a determination that said simulated business outcome satisfies said business value deficiency, said process optimization utility code implements said test BPM and generates an actual business outcome associated with an actual BPM, and said process optimization utility code determines whether said actual business outcome satisfies said simulated business outcome, and wherein responsive to a determination that said actual business outcome does not satisfy said simulated business outcome, said process optimization utility optimizes said actual BPM.

2. The data processing system of claim 1, wherein said process optimization utility code:
  identifies at least one potential business value associated with a business driver or a technology driver; and
  generates a business value proposition to improve said business value deficiency.

3. The data processing system of claim 1, wherein said process optimization utility code modifies said test BPM in response to a determination that said actual business outcome satisfies said simulated business outcome.

4. The data processing system of claim 1, wherein said process optimization utility code optimizes said test BPM and optimizes said actual BPM as a function of at least one of a behavioral model analysis or an actual business outcome data, by utilizing an intelligent feedback mechanism.

5. The data processing system of claim 4, wherein said intelligent feedback mechanism:
  tracks a change to said at least one business value proposition; and
  records a business outcome resulting from said change to said at least one business value proposition; wherein said business outcome includes said modeled business outcome or said actual business outcome.

6. The data processing system of claim 4, wherein said intelligent feedback mechanism utilizes a combination of an Artificial Neural Network (ANN) and a Genetic Algorithm (GA).

7. A computer program product, comprising:
  a computer readable storage medium; and
  process optimization code within said computer readable storage medium and executable by a processor to optimize a Business Process Model (BPM) having at least one work process by determining whether a simulated business outcome associated with a test BPM satisfies a business value deficiency associated with a current BPM, and wherein responsive to a determination that said simulated business outcome does not satisfy said business value deficiency, said process optimization utility code optimizes said test BPM, and wherein responsive to a determination that said simulated business outcome satisfies said business value deficiency, said process optimization utility code implements said test BPM and generates an actual business outcome associated with an actual BPM, and said process optimization utility code determines whether said actual business outcome satisfies said simulated business outcome, and wherein responsive to a determination that said actual business outcome does not satisfy said simulated business outcome, said process optimization utility optimizes said actual BPM.

8. The computer program product of claim 7, wherein the process optimization utility code:
  identifies at least one potential business value associated with a business driver or a technology driver; and
  generates a business value proposition to improve said business value deficiency.

9. The computer program product of claim 7, wherein the process optimization utility code modifies said test BPM in response to a determination that said actual business outcome satisfies said simulated business outcome.

10. The computer program product of claim 7, wherein the process optimization utility code optimizes said test BPM and optimizes said actual BPM as a function of at least one of a behavioral model analysis or an actual business outcome data, by utilizing an intelligent feedback mechanism.

11. The computer program product of claim 10, wherein said intelligent feedback mechanism:
  tracks a change to said at least one business value proposition; and
  records a business outcome resulting from said change to said at least one business value proposition; wherein said business outcome includes said modeled business outcome or said actual business outcome.

12. The computer program product of claim 10, wherein said intelligent feedback mechanism utilizes a combination of an Artificial Neural Network (ANN) and a Genetic Algorithm (GA).

* * * * *